US005791661A

United States Patent [19]
Reyes

[11] Patent Number: 5,791,661
[45] Date of Patent: Aug. 11, 1998

[54] COMPLIANT CHUCK JAWS

[76] Inventor: Peter A. Reyes, 6700 Hadley Dr., Fort Worth, Tex. 76180

[21] Appl. No.: 735,674

[22] Filed: Oct. 23, 1996

[51] Int. Cl.$^6$ .................................................... B23B 31/16
[52] U.S. Cl. ............................ 279/123; 82/1.11; 279/153; 279/154
[58] Field of Search ........................... 279/123, 152–154, 279/110; 82/1.11

[56] References Cited

U.S. PATENT DOCUMENTS

| 2,859,044 | 11/1958 | Buck et al. . |
| 2,903,268 | 9/1959 | Buck et al. . |
| 3,160,042 | 12/1964 | Grand ........................ 279/154 |
| 4,046,390 | 9/1977 | Dunham ..................... 279/153 |
| 4,221,391 | 9/1980 | Dutton . |
| 4,353,561 | 10/1982 | Peterson . |
| 5,071,145 | 12/1991 | Brook . |
| 5,236,207 | 8/1993 | Ramunas et al. . |

FOREIGN PATENT DOCUMENTS 1354695  5/1974  United Kingdom ................... 279/154

*Primary Examiner*—Steven C. Bishop
*Attorney, Agent, or Firm*—James E. Bradley

[57] ABSTRACT

A chuck has a plurality of top jaws for engaging a workpiece. Each top jaw has a recess and a slot that extend completely through the top jaw. The recess and slot allow the forward end of the top jaw to deflect in a rearward direction. This motion allows the jaws to maintain even pressure on the workpiece instead of cocking, thereby minimizing deflection of the workpiece during machining. The slot defines a rearward facing shoulder on the forward end. The maximum deflection of the forward end is limited by the width of the slot. The distance of deflection may be limited by pins located within holes extending through the jaw perpendicular to the slot.

19 Claims, 3 Drawing Sheets

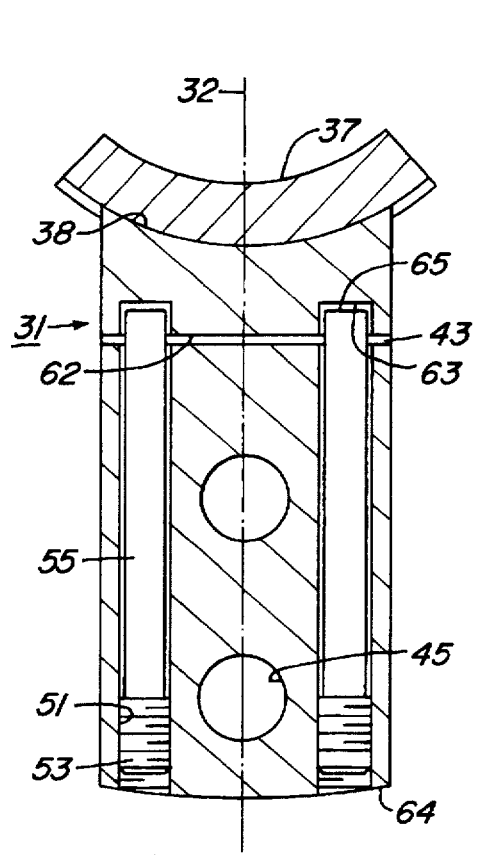
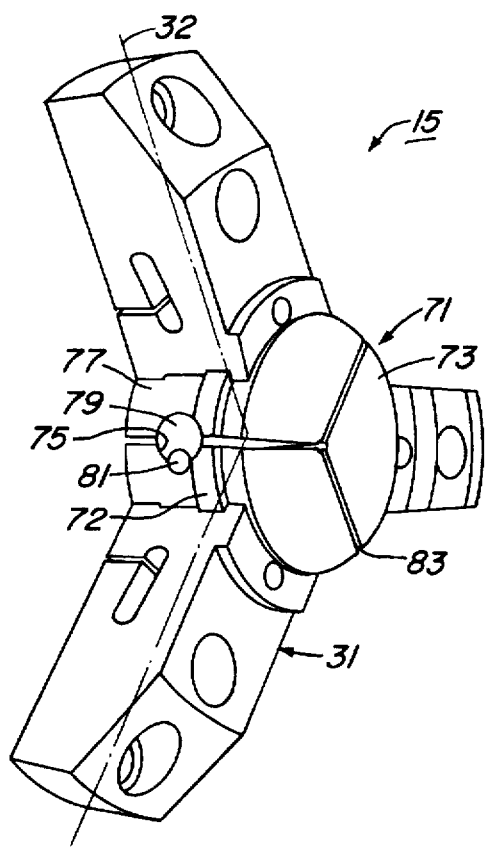
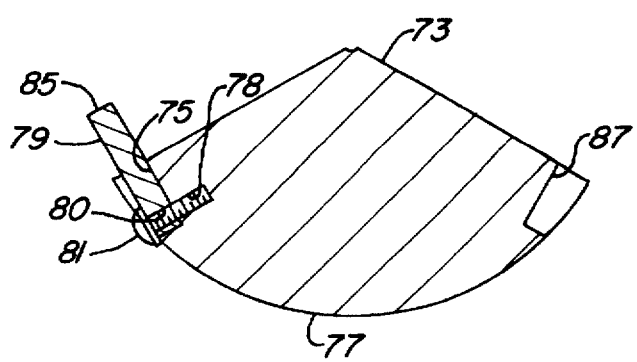

COMPLIANT CHUCK JAWS

TECHNICAL FIELD

The present invention relates generally to lathe chuck jaws and more particularly to lathe chuck jaws which better accommodate long workpieces.

A lathe power chuck has a body with three 120 degree radial slots. Each slot contains a master jaw which moves radially inward and outward in unison with the others. A replaceable top jaw mounts to each master jaw for moving inward to grip a workpiece. When the chuck jaws in a conventional lathe clamp down on a workpiece, the contact surfaces of the chuck jaws sometimes tend to cock or radially deflect away from the workpiece on their forward ends. Chuck jaws that have become worn are especially susceptible to this problem, particularly in environments requiring high gripping pressures. Traditional chuck jaws usually work well under normal operating conditions. However, under high gripping pressure or with longer workpieces, a slight deflection of the rotating workpiece becomes a serious problem at its forward end as the deflection is magnified over the length of the workpiece causing the workpiece to vibrate.

In addition, top jaws have replaceable pads mounted to them which engage the workpiece. Although pads can be purchased, a machinist may wish to fabricate pads from soft bar stock using a lathe. While this method is feasible, a more convenient means is needed. Furthermore, with new top jaws, a machinist may wish to true the contact surfaces of the jaws which receive the pads to match the jaws to the lathe. However, a convenient means to true the jaws is needed.

DISCLOSURE OF INVENTION

In this invention, each of the top jaws has a transverse recess and slot, with the slot connecting the recess with the bottom side. Both the recess and the slot extend completely through the top jaw. The recess and the slot allow a slight flexing of the contact face of the top jaw relative to the bottom.

Preferably, each top jaw has two threaded holes that are parallel to the central axis of the jaw and extend from a rearward end to the slot. Each of the holes contains a set screw and a loading pin whose combined length is less than the length of the hole. When the screw is threaded into the hole, the screw slidingly moves the pin toward the contact face of the top jaw. This arrangement is used to limit the deflection of the top jaw.

In operation, the jaws are clamped against a workpiece. When the contact faces apply clamping pressure to the workpiece, the recess and slot allow the forward end of the top jaw to deflect to remain in flush engagement with the workpiece. This motion allows the pads to maintain even pressure on the workpiece instead of cocking, thereby minimizing deflection of the workpiece during machining. The slot defines a rearward facing shoulder on the forward end. The maximum deflection of the forward end is limited by the loading pins as the shoulder will eventually bottom out on the loading pins.

BRIEF DESCRIPTIONS OF DRAWINGS

FIG. 3 is a sectional top view of the top jaw of FIG. 2, taken along the line 3—3 of FIG. 2.

FIG. 4 is an isometric view of the top jaws of FIG. 1 holding pad blanks prior to machining into pads.

FIG. 5 is a sectional top view of one pad blank.

DETAILED DESCRIPTION OF THE DRAWINGS

Figure 1:
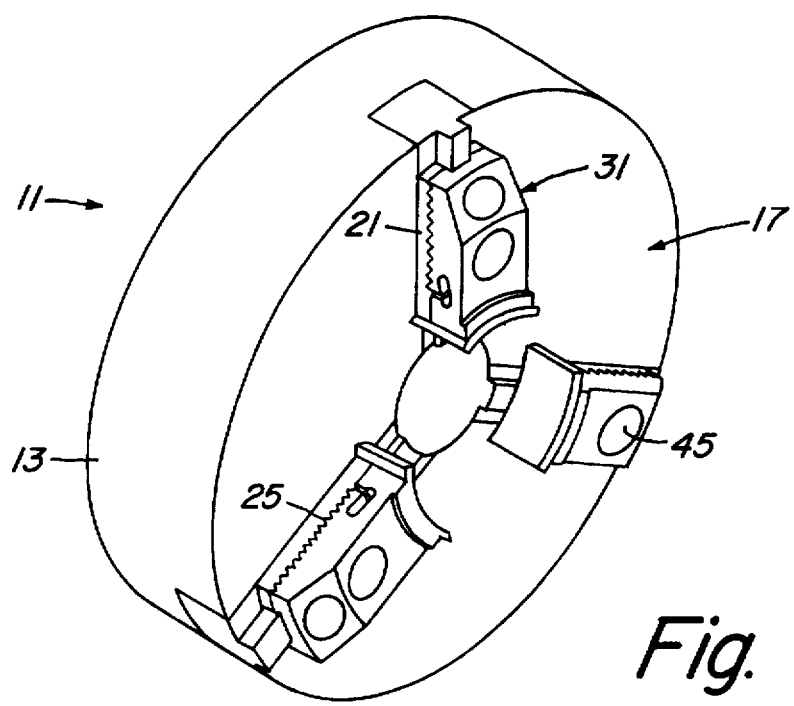
FIG. 1 is an isometric view of a power chuck having chuck jaws constructed according to the invention.

Referring to FIG. 1, one embodiment of a chuck jaw assembly is shown. Chuck 11 has a cylindrical body 13 and a plurality of top jaws 31 that are each removably secured to a master jaw 21. Master jaws 21 radially slide along a top side 17 of body 13. The words "top" and "bottom" are used only for convenience and do not refer to actual upper and lower surfaces. Each master jaw 21 has a row of grooves 25 on a top side which engage mating grooves 35 on a bottom side 33 of top jaw 31. Top jaw 31 is removably secured to master jaw 21 with bolts (not shown) that extend through sockets 45 in top jaw 31. The bolts thread into receptacles (not shown) in master jaw 21 that align with sockets 45.

Figure 2:
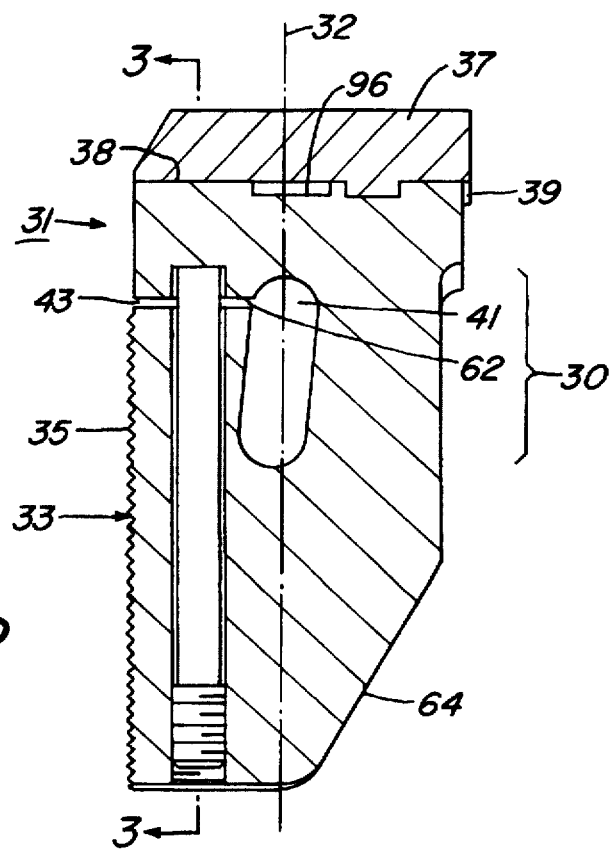
FIG. 2 is a sectional side view of one of the top jaws of the chuck of FIG. 1.

A sectional side view of one of the top jaws 31 is shown in FIG. 2. Top jaw 31 has a longitudinal axis 32 and a bottom side 33 that is parallel to axis 32. Top jaw 31 has a replaceable insert or pad 37 that is removably secured to a forward end or face 38 with a clamp screw 39. In an alternate embodiment (not shown), pad 37 may be attached to top jaw 31 with a screw that extends through a hole parallel to the longitudinal axis 32. Pad 37 is used to provide a contact surface to hold a workpiece to be machined. Pads 37 can be for round stock, hex stock, square stock, or can be custom made to other configurations. Each top jaw 31 has an elliptical aperture or recess 41 that is at an acute angle relative to axis 32. Top jaw 31 has a slot 43 that is perpendicular to axis 32 and connects recess 41 with bottom side 33. Slot 43 is approximately one-tenth of an inch wide in the preferred embodiment.

Both recess 41 and slot 43 extend completely through top jaw 31, from one side to the other. Top jaw 31 has two threaded holes 51 that are parallel to axis 32. Holes 51 extend from a rearward end 64 of top jaw 31 toward forward end 38. Holes 51 extend through slot 43 and a slot wall 62, but holes 51 do not completely penetrate top jaw 31. Each hole 51 contains a set screw 53 and a loading pin 55 whose combined length is less than the length of hole 51. When screw 53 is threaded into hole 51, screw 53 slidingly moves pin 55 toward forward end 38 of top jaw 31. If screw 53 is advanced to full make-up, pin 55 will contact the end or backstop 63 of hole 51. Backstop 63 should be considered as a part of slot wall 62.

The positions of pins 55 are set to provide a desired clearance between backstop 63 and the ends of pins 55. This determination adjusts the effective width of slot 43 and, thus, the amount of allowed deflection. The amount of deflection required for each job is a function of the material of the workpiece, the chuck hydraulic pressure, and the condition of the chuck. During set-up, pins 55 are loosened and spaced apart from backstop 63. Next, a workpiece is "preloaded" in chuck 11 by clamping top jaws 31 on the workpiece at the desired pressure. Once the amount of deflection required for a certain job is determined by preloading chuck 11, pins 55 are firmly locked against backstop 63 while top jaws 31 are clamped on the workpiece. This is done to limit deflection of forward end 38 to that point. The workpiece may then be machined. This configuration provides a more rigid condition for heavy machining loads. Top jaw 31 may also be effectively locked from all motion while under load by simply locking pins 55 against backstop 63 prior to applying any load. When chuck 11 is opened to load the next workpiece, forward end 38 of top jaw 31 can flex in a forward direction from the clamped position. The forward ends of pins 55 will now be spaced away from backstop 63.

In operation, a plurality of top jaws 31 are clamped against a workpiece (not shown). When pad 37 applies clamping pressure to the workpiece, recess 41 and slot 43 allow forward end 38 of top jaw 31 to deflect relative to bottom side 33. When deflecting, the width of slot 43 decreases until pins 55 contact backstop 63. Referring to FIG. 2, zone 30 is the area of top jaw 31 which undergoes bending to achieve the required compliant behavior. This motion allows pad 37 to maintain even pressure on the workpiece instead of cocking, thereby minimizing deflection of the workpiece during machining. In this motion, zone 30 of top jaw 31 acts like a spring or a hinge.

The maximum deflection of forward end 61 is limited by the width of slot 43 and the placement of pins 55 as pins 55 will eventually contact or bottom out on backstop 63. Pins 55 may be positioned to provide a desired gap between pins 55 and backstop 63. In this position, forward end 38 will be able to deflect only until pins 55 contact backstop 63 since screws 53 will stop further rearward movement of pins 55 by acting as a hard stop. In an alternate embodiment, holes 51 may end at slot 43 (not shown) and not penetrate slot wall 62. In this alternate embodiment, pins 55 would simply land on slot wall 62 which serves as the backstop to limit deflection of forward end 38.

Pads 37 may be created with this invention for matching a particular chuck. As shown in FIG. 4, a cylindrical pad blank 71 is loaded into chuck 11. Pad blank 71 has been previously cut into a number of congruent sections 73 equal to the number of jaws 15 utilized by chuck 11. Also, prior to cutting pad blank 71 into sections, an annular rib 72 is cut on the exterior of pad blank 71 to match the contours on the face of top jaw 31. A sectional view of a single section 73 is shown in FIG. 5. Each section 73 has semi-cylindrical notches 75 located near partially cylindrical outer wall 77. Section 73 has a threaded hole 78 at outer wall 77 which extends radially inward. Notches 75 function as keyed slots for closely receiving a disk 79.

Sections 73 are joined together to form cylindrical pad blank 71 by inserting disk 79 into notch 75, inserting a screw 81 through a hole 80 in disk 79, and threading screw 81 into hole 78 to rigidly secure disk 79. Referring to FIG. 5, after installing a disk 79 on each section 73, sections 73 are assembled together by inserting a protruding end 85 of each disk 79 into the remaining notch 87 on an adjacent section 73 until the complete pad blank 71 is assembled. Disks 79 keep sections 73 slightly spaced apart by slots 83 and transmit torque from one section 73 to another. Without disks 79, slippage of sections 73 relative to each other might occur. Pad blank 71 can then be loaded into chuck 11 to be machined by boring the three sections 73 simultaneously. After machining is completed, pad blank 71 can be disassembled into pads 37 by reversing the order of assembly stated above.

Figure 6:
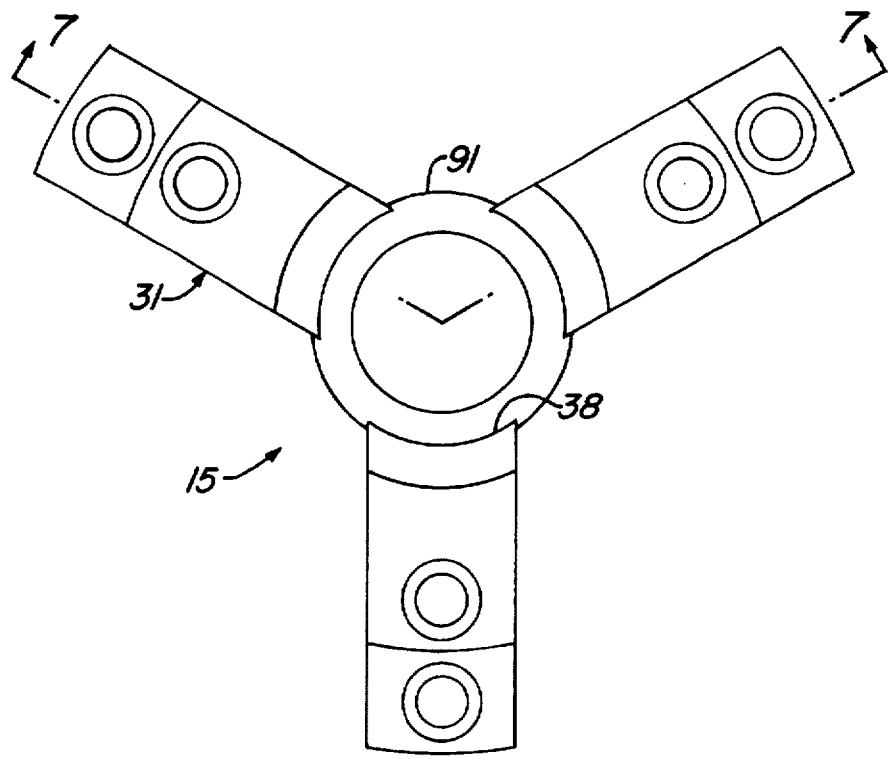
FIG. 6 is a top view of the top jaws holding a truing ring as they would be configured in a chuck for truing contact faces of top jaws prior to mounting the contact pads.
Figure 7:
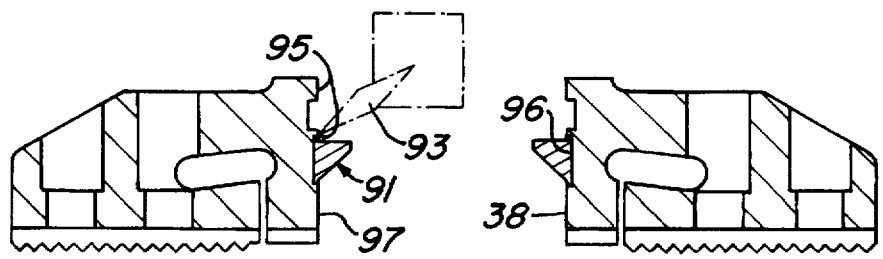
FIG. 7 is a sectional side view of two top jaws of FIG. 6, taken along the line 7—7 of FIG. 6, and shown during a truing operation.

Referring to FIGS. 6 and 7, in another operation, face 38 of each top jaw 31 may need to be trued. In order to true one face 38, all top jaws 31 must be trimmed. Trimming operations are performed to match faces 38 with the particular chuck. A truing ring 91 is manufactured so that when clamped by jaws 31 in chuck 11 with the proper pressure, a light cut is sufficient to true faces 38.

Truing ring 91 is clamped between top jaws 31 without pads 37 installed. Truing ring 91 locates within a recess 96 on face 38 that will not be in contact with pad 37 when pad 37 is installed. Only the contact surfaces 95 and 97 above and below recess 96 need be trued. Referring to FIG. 7, truing ring 91 is configured to allow a cutting tool 93 to cut on upper portion 95 of face 38 while top jaws 31 are clamped under hydraulic pressure simulating actual conditions of use. Cutting tool 93 may also extend through truing ring 91 in order to cut lower portion 97 of face 38. Once the trimming operation is complete, truing ring 91 can be removed, and pads 37 should seat properly on faces 38.

This invention has several advantages. A slot and recess in the forward portion of the top jaws allows the jaws to deflect slightly under load in order to maintain even gripping pressure on the workpiece. This feature adds precision and safety by minimizing vibration of the workpiece during machining. The jaws contain a pin and screw mechanism that is used to limit deflection of the top jaw to provide a more rigid condition for heavy machining loads. The invention also comprises novel means for creating customized jaw pads and for truing the faces of the top jaws.

While the invention has been shown in some of its forms, it should be apparent to those skilled in the art that it is not so limited, but is susceptible to various changes without departing from the scope of the invention.

I claim:

1. A top jaw with a bottom side for engaging a master jaw of a lathe chuck having a rotational axis, the top jaw having a longitudinal axis that is adapted to be perpendicular to the rotational axis, a forward end that is adapted to engage a workpiece, and a rearward end, the top jaw comprising in combination:

a recess extending through the top jaw transverse to the longitudinal axis; and a slot extending through the top jaw transverse to the longitudinal axis, the slot connecting the recess to the bottom side of the top jaw, and the slot and recess allowing the forward end of the top jaw to deflect when the top jaw applies pressure to the workpiece, in order to maintain a desired interface between the forward end and the workpiece.

2. The top jaw according to claim 1, wherein the slot has a width which is reduced when the forward end deflects.

3. The top jaw according to claim 2, further comprising means for limiting the decrease in the width of the slot when the top jaw applies pressure to a workpiece.

4. The top jaw according to claim 1 wherein the slot has a width that is less than the longitudinal length of the recess.

5. The top jaw according to claim 1, wherein the slot has a forward backstop and wherein the top jaw further comprises:

a hole with a length that is parallel to the longitudinal axis and the bottom side, the hole extending from the rearward end of the top jaw into the slot;

a pin located in the hole, the pin having a forward end; and means for adjusting a distance between the forward end of the pin and the forward backstop of the slot to cause the forward backstop of the slot to contact the forward end of the pin while at a desired maximum deflection.

6. The top jaw according to claim 1, wherein the slot has a forward backstop and wherein the top jaw further comprises:

a threaded hole with a length that is parallel to the longitudinal axis and the bottom side, the hole extending from the rearward end of the top jaw into the slot;

a screw which threads into the threaded hole; and a loading pin within the threaded hole, the pin being slidingly moveable toward the forward backstop of the slot by the screw when the screw is rotated into the hole to provide a desired gap between the pin and the forward backstop of the slot prior to deflection of the top jaw, so that deflection of the forward end of the top jaw can be limited to a point where the pin contacts the forward backstop.

7. The top jaw according to claim 1 wherein the slot is perpendicular to the longitudinal axis and the bottom side of the top jaw.

8. The top jaw according to claim 1 wherein the slot is located closer to the forward end of the top jaw than to the rearward end of the top jaw.

9. In a lathe chuck having a rotational axis, a plurality of master jaws which are radially adjustable across a face of the chuck to hold a workpiece, a plurality of top jaws, each top jaw having a bottom side which mates with a master jaw, and each of the top jaws having a longitudinal axis that is perpendicular to the rotational axis, a forward end for engaging the workpiece, a rearward end, and a left side and a right side, each of the top jaws comprising in combination:

a recess extending through the top jaw from the left side to the right side, transverse to the longitudinal axis;

a slot extending through the top jaw from the left side to the right side, transverse to the longitudinal axis and perpendicular to the bottom side, the slot joining the recess to the bottom side, the slot having a width substantially smaller than a longitudinal dimension of the recess, and the slot and recess allowing the forward end of the top jaw to deflect when the top jaw applies pressure to the workpiece, thereby decreasing the width of the slot, in order to maintain a desired interface between the forward end and the workpiece; and means for limiting the decrease in the width of the slot when the top jaw applies pressure to a workpiece.

10. The lathe chuck according to claim 9, wherein the slot has a forward backstop and a rearward wall, and wherein the means for limiting the decrease in the width of the slot further comprises:

a hole with a length that is parallel to the longitudinal axis and the bottom side, the hole extending from the rearward end of the top jaw;

a pin located in the hole, the pin having a forward end; and means for adjusting a distance between the forward end of the pin and the forward backstop of the slot to cause the forward backstop of the slot to contact the forward end of the pin when the top jaw is at a desired maximum deflection.

11. The lathe chuck according to claim 9, wherein the slot has a forward backstop and wherein the means for limiting the decrease in the width of the slot further comprises:

a threaded hole with a length that is parallel to the longitudinal axis and the bottom side, the hole extending from the rearward end of the top jaw into the slot;

a screw which threads into the threaded hole; and a loading pin within the threaded hole, the pin being slidingly moveable toward the forward backstop of the slot by the screw when the screw is rotated into the hole to provide a desired gap between the pin and the forward backstop of the slot prior to deflection of the top jaw so that deflection of the forward end of the top jaw can be limited to a point where the pin contacts the forward backstop.

12. The lathe chuck according to claim 9 wherein the slot is perpendicular to the longitudinal axis of the top jaw.

13. The lathe chuck according to claim 9 wherein the slot is located closer to the forward end of the top jaw than to the rearward end of the top jaw.

14. A method for creating pads for top jaws, comprising:

(a) providing a pad blank with a rotational axis;

(b) cutting the pad blank into congruent sections by making at least three radial cuts from an axis of rotation of the pad blank, each section having two flat radial side walls that are adjacent to side walls of other sections, the side walls of each section being connected by an outer wall which is provided with a notch at a junction with one of the radial side walls;

(c) assembling the sections with the radial side walls of each section separated from adjacent side walls by a slit having a width;

(d) releasably fastening a key to the outer wall of each of the sections such that each of the keys extends across one of the slits into engagement with one of the notches to prevent the width of any of the slits from changing;

(e) loading the assembled sections into a chuck; and (f) after completing step (e), boring a hole into the assembled sections to create at least three pads.

15. A method for creating pads for top jaws, comprising:

(a) providing a pad blank with a rotational axis;

(b) cutting the pad blank into congruent sections by making at least three radial cuts from an axis of rotation of the pad blank, each section having two flat radial side walls that are adjacent to side walls of other sections, the side walls of each section being connected by an outer wall;

(c) assembling the sections with the radial side walls of each section separated from adjacent side walls by a slit having a width;

(d) releasably installing a key on the outer wall of each of the sections to prevent the width of any of the slits from changing;

(e) loading the assembled sections into a chuck; and (f) after completing step (e), boring a hole into the assembled sections to create at least three pads; wherein steps (c) and (d) further comprise:

providing each of the sections with a notch on each of the side walls, the notches being located near the outer wall of each of the sections and dimensioned for closely receiving Part of one of the keys;

providing a threaded hole at each of the outer walls, each of the holes extending radially inward through one of the notches;

each of the keys having a radial ax is and a hole that is parallel to the radial axis;

placing each of the keys in one of the notches and orienting each of the keys so that the hole in the key aligns with the hole in the section;

inserting a screw through each of the holes in each of the keys and rotating the screw into the threaded hole in each of the sections in order to rigidly secure each of the keys to its accompanying section; and joining the sections together by placing a protruding portion of each of the keys into the remaining notch on the mating adjacent section.

16. A method for truing a forward face on each of a plurality of top jaws of a lathe chuck with a rotational axis and a cutting tool, comprising:

forming a recess across each of the faces between an upper side and a lower side of each of the top jaws;

mounting the top jaws to the chuck;

clamping a truing ring in the recesses in the top jaws, such that the ring is concentrically located on the axis;

rotating the chuck and moving a cutting tool into contact with the faces on an outer side of the ring; then moving the cutting tool into contact with the faces on an inner side of the ring.

17. A top jaw with a bottom side for engaging a master jaw of a lathe chuck having a rotational axis, the top jaw having a longitudinal axis that is adapted to be perpendicular to the rotational axis, a forward end that is adapted to engage a workpiece, and a rearward end, the top jaw comprising in combination:

a cavity extending through the top jaw transverse to the longitudinal axis and having a portion extending to the bottom side of the top jaw, and the cavity being dimensioned to cause the forward end of the top jaw to deflect when the top jaw applies clamping pressure to the workpiece in order to maintain a desired interface between the forward end and the workpiece.

18. The top jaw according to claim 17, wherein the cavity has a bottom longitudinal dimension where it joins the bottom side which is reduced when the forward end deflects.

19. The top jaw according to claim 18, further comprising an adjustable stop which extends across the cavity parallel to the longitudinal axis adjacent the bottom side for limiting the decrease in the bottom longitudinal dimension of the slot when the top jaw applies pressure to the workpiece.

* * * * *